Patented Jan. 1, 1929.

1,697,714

UNITED STATES PATENT OFFICE.

JEREMIAH BUTLER, OF OXFORD, PENNSYLVANIA, ASSIGNOR OF ONE-HALF TO ISAAC P. WALTON, OF OXFORD, PENNSYLVANIA.

SOLDER FOR CAST IRON AND OTHER METALS FOR SURFACING THEM.

No Drawing.   Application filed December 30, 1927.   Serial No. 243,771.

The present invention relates to an improved composition of matter compounded for making solder for use in connection with various metals and in particular cast iron, and which can be used for surfacing various metals.

While there are various solders used and which are more or less ineffective for all purposes where solders can be used, it is the purpose of the present invention to provide an improved solder particularly adapted for use in conenction with cast iron and for surfacing cast metals, that is used effectively for securely fastening opposed pieces of cast iron.

Another purpose of the invention resides in the particular proportions and the method of compounding, which has been found to insure effective use from a practical view point.

It is to be understood that the particulars herein given are in no way limitive, and that while still keeping within the scope of the invention, any desired modification of details and proportions may be made in the composition of matter according to circumstances.

The invention comprises further features and combination of ingredients to be hereinafter set forth and claimed.

In compounding the solder, a requisite amount of ground steel may be placed in a steel or cast iron vessel and brought to a molten state and particularly to red heat. Pure lead is then added to the molten ground steel with block tin subsequently added. After adding the pure lead the molten mixture is maintained at a red heat for at least ten minutes, and then the block tin is added, the mixture still being maintained at a red heat.

A flux consisting of steel and emery, tobin bronze in a fine state, plaster of Paris, borax, epsom salts and salt, having allowed this mixture to remain in a molten state for approximately fifty minutes as near white heat as possible, keeping corn cobs or the like on the top of the vessel to obtain potash and thereby equalize the heat. This flux is mixed with the first named ingredients, that is the ground steel, pure lead and block tin. However, a small quantity of this flux is saved and is to be applied just before the entire composition of matter is removed from the furnace.

In soldering pieces of metal, preferably cast iron and resurfacing various metals a of hydrochloric acid made fresh, at least not more than three days standing, to which a requisite quantity of zinc is added, until it ceases to dissolve, then a requisite quantity of bicarbonate of soda is added to the composition matter.

This mixture of flux may be strained through a clean cloth.

When fastening opposed pieces of metal preferably cast iron, or surfacing various metals in particular cast iron, a requisite quantity of this flux is applied, and then the solder is used for uniting the opposed metal or applied for surfacing the metal.

The various ingredients of this composition of matter are in the following proportions for one pound, which may be increased or decreased proportionately according to the quantity needed, to wit:

| | Ounces. |
|---|---|
| Ground steel | 3 |
| Pure lead | 13½ |
| Pure block tin | 3½ |

The flux to mix with these proportions of the first ingredients is compounded in the following proportions, to wit:

| | Ounces. |
|---|---|
| Steel and emery | 2 |
| Tobin bronze | 1½ |
| Plaster of Paris | 1 |
| Borax | 1 |
| Epsom salts | ½ |
| Salt | ½ |

In using the solder the flux consisting of hydrochloric acid, zinc and bicarbonate of soda, is applied to the opposed metals to be united, then the solder is applied, sufficient heat being used to melt the solder and cause a secure adherence between the two parts. In surfacing a piece of metal the metal may be dipped in the flux solution.

While these proportions are herein defined for the quantity previously named, it is obvious that a greater or less quantity may be compounded, with the ingredients proportionately increased or decreased.

The invention having been set forth, what is claimed is:

A composition of matter for soldering or welding, consisting of ground steel, pure lead and block tin, having a flux consisting of steel and emery and tobin bronze of a gredients being approximately in the following proportions, to wit:

| | Ounces. |
|---|---|
| Ground steel | 3 |
| Pure lead | 1½ |
| Block tin | 1½ |
| Flux, steel and emery approximately equal proportions | 2 |
| Tobin bronze | 1½ |
| Plaster of Paris | 1 |
| Borax | 1 |
| Epsom salts | ½ |
| Salt | ½ |

In testimony whereof he affixes his signature.

JEREMIAH BUTLER.